Jan. 20, 1931.   M. F. RICHARDSON   1,789,711
VALVE
Filed Sept. 1, 1928
FIG. I.
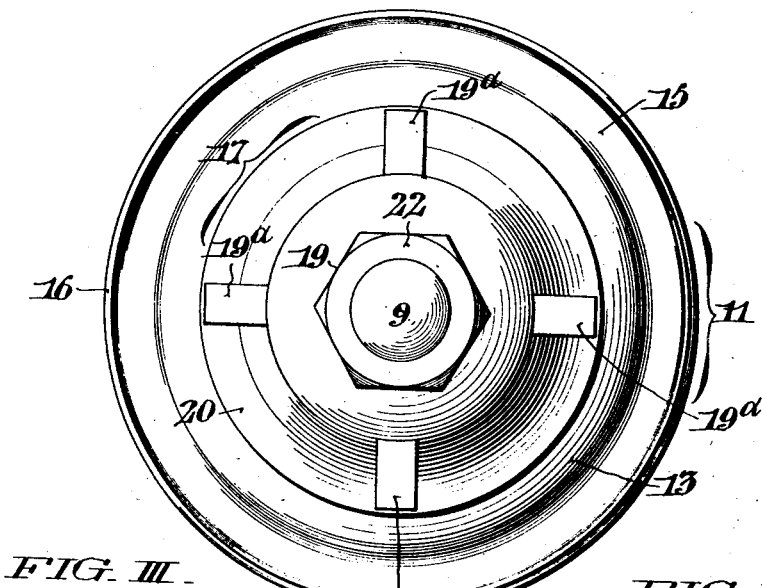
FIG. III.
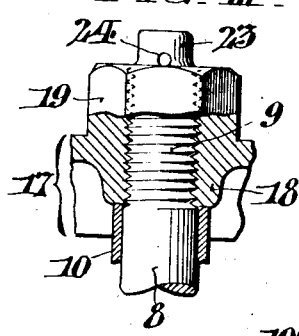
FIG. IV.
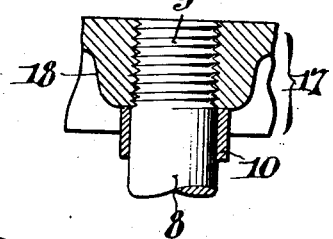
FIG. II.
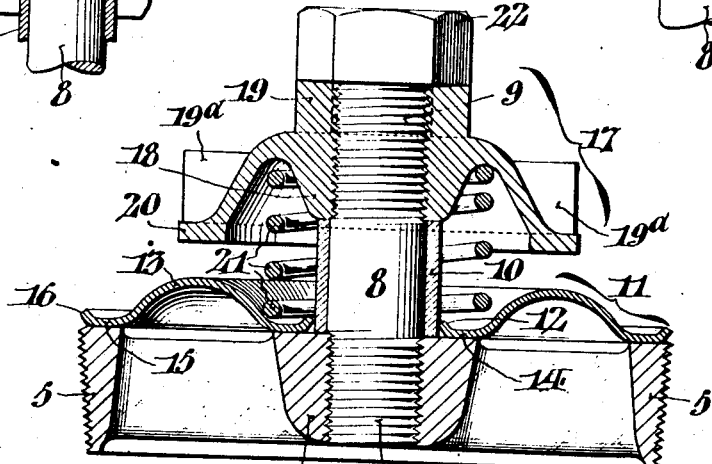
WITNESSES
Thomas W. Kerr Jr.
William Bell
INVENTOR:
Maurice F. Richardson,
BY Foley Paul
ATTORNEYS.

UNITED STATES PATENT OFFICE

MAURICE F. RICHARDSON, OF BERWYN, PENNSYLVANIA

VALVE

Application filed September 1, 1928. Serial No. 303,376.

This invention relates generally to valves of the disc form, and more particularly to a pump valve capable of operating responsively to suction and pressure pulses in opening and closing the valve ports, such type usually including associated means definitely limiting the movement of the disc element.

The primary object of this invention is the provision of an improved form of valve, the disc of which can be easily removed, inspected and replaced, without dismantling the stem and seat therefor.

Another object is to provide a valve of the type referred to including novel means effective to protect the disc against "jamming" on the stem as well as insuring proper and uniform lift of the former.

A further object is the provision of an improved disc valve which is simple in construction, extremely light in weight, of great strength, efficient in operation, and withal capable of long usage without necessitating constant inspection.

With the foregoing objects in view, this invention essentially embraces the matters hereinafter set forth, typically illustrated in the accompanying sheet of drawings, and more specifically defined by the appended claims.

In the drawings:—

Fig. I is a top plan view of a disc valve embodying the present improvements.

Fig. II is an axial section of the same.

Fig. III is a fragmentary sectional view of a modified manner of securing the valve guard—hereinafter further explained—in position; and, Fig. IV is a similar view of a further modification.

Referring more in detail to the illustrations my improved pump valve comprises a ported seat member 5 having a central hub 6, which is apertured and screw-threaded to receive the correspondingly threaded lower end 7 of the valve stem 8; and, incidentally, it is to be noted that the stem 8 is thus, to all practical intent, permanently secured in said seat member. This stem 8 is also screw-threaded at 9 along a part of its upper end, for a purpose later on explained; while it is fitted with a sleeve 10 which can be quickly removed and replaced, when necessary. This removable sleeve 10 constitutes the fundamental feature of the instant invention and its purposes will be hereinafter fully set forth.

The movable member or valve disc 11 is preferably made of sheet metal to the cross-section shown in Fig. II, and provided with an inner flared lip 12 adapted to freely move over the sleeve 10 aforesaid. Intermediate the flared lip 12 and its outer periphery, the valve disc 11 is annularly arched at 13 between inner and outer concentric flats 14, 15, respectively; which are adapted to engage co-planar seats of the seat member 5, and a peripheral stiffener flange 16 is provided, inclined slightly outwards to induce stream line flow through the valve.

Engaging the upper screw-threaded end 9, of the valve stem 8, is an overhang or guard member 17 of convex formation, said guard member having a central hub 18 with a polygonal-shaped manipulator extension 19 and a series of lugs 19a whereby it may be screwed down into abutment with the sleeve 10, by either a socket wrench, or suitable spanner, in an obvious manner. The guard member 17 is also provided with a lateral lip flange 20 affording an abutment surface with which the arched annular portion 13, of the disc valve 11, engages when the latter is lifted. A helical spring 21, in compression between the guard member 17 and the disc valve 11 serves to normally hold the latter firmly to its seat; while it is to be noted said spring is of a diameter to abut the lower inner face of the annular arched portion 13, where it merges with the flat 14, so that the valve disc 11 is effectively prevented from "canting" or tilting in operation.

A nut 22 in engagement with the upper screw-threaded end 9, of the valve stem 8, serves to effectively lock the guard 17 to said stem, while it is to be particularly observed that the sleeve 10 ensures proper and uniform valve lift at all times. Furthermore, it is noteworthy that there is no possibility of the valve disc 11 ever fouling or "catching" on either of the stem screw-threaded portions 7 and 9, even if the former portion 7 be not entirely driven into the hub 6. Still further, attention is directed to the fact that by incorporating the sleeve 10 in the valve assemblage, the stem 8 thereof is safeguarded against wear, as if any such wear occurs it is upon said sleeve, while the latter is capable of quick removal and cheap replacement.

In the slightly modified form of this invention, shown by Fig. III, it will be seen that the lock nut 22 above described is dispensed with, and in lieu thereof I reduce the upper extremity of the valve stem 8 at 23, and provide such reduced extension with one or more diametric apertures 24, for reception of a suitable cotter pin—not shown.

In the showing of Fig. IV, it is observable that I simply screw the guard member hub 18 tightly down upon the sleeve 10, and omit the extension 19 thereof; as well as dispense with either the lock nut 22, or the cotter means set forth in the preceding paragraph, whereby there is provided a compact valve convenient for use in places with but limited head space.

In operation, as the valve is subjected to suction from above or pressure from below, the disc 11 lifts against the compressive force of the spring 21 to the limit imposed by the flange 20, of the guard member 17; while it is maintained, during such lift, against tilting incident to the allocation of the compressive force of the spring 21, as hereinbefore set forth.

From the foregoing it is though that my invention will be well understood and that it embodies all the features of advantage hereinbefore set forth, and while I have mentioned its particular adaptation for pumps, it will be understood that it may be equally well employed for other purposes.

Having thus described my invention, I claim:

1. A pump valve comprising a ported seat member with a co-axial hub, a guide stem screwed in said hub and having its upper end correspondingly threaded, a convex guard engaging on said threaded upper end and having a concentric manipulator extension, means locking said guard on the valve stem, an annularly-arched disc having an inner upwardly flared lip and an outer inclined stiffener flange co-operative with the valve seat and free of guidance by the guard, a helical spring under compression intermediate the disc and guard, and a sleeve on the valve stem spacing the guard relative to the valve seat as well as serving to aid in rigidly securing said parts in assembled relation.

2. A pump valve comprising a ported seat member with a co-axial hub, a guide stem screwed in said hub and having its upper end correspondingly threaded, a convex guard engaging on said threaded upper end and having a concentric manipulator extension, a lock nut on the valve stem co-operative with the guard manipulator extension, an annularly-arched disc operative between the valve seat and guard, said disc being free of guidance by the guard and having an inner upwardly flared lip and an outer similarly inclined stiffener flange, a helical spring under compression intermediate the disc and guard, said spring being of a diameter and allocated to restrain the disc against tilting during lifting, and a sleeve on the valve stem spacing the guard relative to the valve seat as well as serving to aid in rigidly securing said parts in assembled relation.

3. A pump valve comprising a ported seat member with a co-axial hub, a guide stem screwed in said hub and having its upper end similarly threaded, a convex guard threaded on the stem upper end having a concentric polygonal extension and with radial lugs about its outer surface whereby said guard may be manipulated by either a socket or spanner wrench, an annularly-arched disc operative between the valve seat and guard, said disc being free of guidance by the guard and having an inner upwardly flared lip and an outer similarly inclined stiffener flange, a helical spring under compression intermediate the disc and guard, said spring being of a diameter and allocated to restrain the disc against tilting during lifting, and a sleeve on the valve stem spacing the guard relative to the valve seat as well as serving to aid in rigidly securing said parts in assembled relation.

In testimony whereof, I have hereunto signed my name at Philadelphia, Pennsylvania, this 27th day of August, 1928.

MAURICE F. RICHARDSON.